(12) United States Patent
Wissmiller et al.

(10) Patent No.: US 10,937,011 B1
(45) Date of Patent: Mar. 2, 2021

(54) SYSTEM AND METHOD FOR MONITORING AND UPDATING CONTENT FOR AN E-COMMERCE PLATFORM

(71) Applicant: Rodan & Fields, LLC, San Francisco, CA (US)

(72) Inventors: Heidi Wissmiller, San Francisco, CA (US); Julie Vlahos, San Francisco, CA (US); Jahan Shafizadeh, Lafayette, CA (US); Erin Oles, San Rafael, CA (US)

(73) Assignee: Rodan & Fields, LLC, San Francisco, CA (US)

( * ) Notice: Subject to any disclaimer, the term of this patent is extended or adjusted under 35 U.S.C. 154(b) by 0 days.

(21) Appl. No.: 16/568,171

(22) Filed: Sep. 11, 2019

Related U.S. Application Data

(60) Provisional application No. 62/729,927, filed on Sep. 11, 2018.

(51) Int. Cl.
*G06Q 20/12* (2012.01)
*G06Q 30/06* (2012.01)

(52) U.S. Cl.
CPC ....... *G06Q 20/123* (2013.01); *G06Q 30/0641* (2013.01)

(58) Field of Classification Search
CPC .................. G06Q 30/00–08; G06Q 20/123
See application file for complete search history.

(56) References Cited

U.S. PATENT DOCUMENTS

| | | | |
|---|---|---|---|
| 5,796,967 A | 8/1998 | Filepp et al. | |
| 5,961,601 A | 10/1999 | Iyengar | |
| 7,072,849 B1 | 7/2006 | Filepp et al. | |
| 7,631,346 B2 | 12/2009 | Hinton et al. | |
| 2010/0306368 A1* | 12/2010 | Gagliardi | G06F 16/951 709/224 |
| 2015/0215393 A1* | 7/2015 | Liu | H04L 67/104 709/203 |

(Continued)

OTHER PUBLICATIONS

Epicentric and Documentum Unveil New Enterprise Content Management Web Service Modules for E-Business Networks. Business Editors/High-Tech Writers . Business Wire ; New York [New York]Apr. 11, 2001: 1. <Retrieved via ProQuest\> (Year: 2001).*

(Continued)

*Primary Examiner* — Michael Misiaszek
(74) *Attorney, Agent, or Firm* — Kilpatrick Townsend & Stockton LLP

(57) ABSTRACT

Disclosed is a system and method for providing, accessing, monitoring and updating content on an e-commerce platform. The platform may have different user interfaces for consultants who act on behalf of an entity to market a product provided by the entity, and for prospects who are interested in learning more about the product, purchase the product and/or become part of the team to market the product. The consultants may upload digital content to the platform via their dedicated consultant interface and the prospects may access the digital content on the platform via their dedicated prospect interfaces. Contents of the prospect webpage and how the prospects interacts with their prospect webpage may be monitored. The contents of the prospect webpage may be updated, automatically or by the consultant associated with that prospect, based on the monitoring.

16 Claims, 6 Drawing Sheets

(56) References Cited

U.S. PATENT DOCUMENTS

| | | | |
|---|---|---|---|
| 2016/0125444 A1 | 5/2016 | Shaw et al. | |
| 2016/0253710 A1* | 9/2016 | Publicover | H04W 4/21 |
| | | | 705/14.66 |
| 2017/0098242 A1* | 4/2017 | Gould | G06Q 30/0282 |
| 2017/0344209 A1* | 11/2017 | Gordon | G06F 3/0484 |
| 2018/0025405 A1* | 1/2018 | Jones | G06Q 30/0631 |
| | | | 705/26.7 |
| 2018/0276226 A1* | 9/2018 | Knight | H04L 67/32 |

OTHER PUBLICATIONS

An Efficient Re-Ranking Algorithm by Refining Client Side Log to Predict User's Interest Based on Web Personalization. Mercy Paul Selvan, Dr. A. Chandrasekar. National Journal on Advances in Computing & Management vol. 5 No. 2 Oct. 2014, p. 13-19. <Retrieved via ProQuest\> (Year: 2014).*

* cited by examiner

SYSTEM AND METHOD FOR MONITORING AND UPDATING CONTENT FOR AN E-COMMERCE PLATFORM

RELATED APPLICATIONS

This application claims the benefit of and priority to U.S. Provisional Application No. 62/729,927, filed Sep. 11, 2018, the entire content of which is incorporated herein by reference for all purposes.

BACKGROUND

E-commerce platforms allow entities to conduct commercial transactions electronically using the Internet. An entity may advertise, market and sell their product or services on an e-commerce platform. A consumer may review the information provided on the e-commerce platform, and purchase the goods or services made available on the platform.

Conventionally, entities use social media outlets to advertise and/or provide further information about their product or services. For example, sales people may post online videos explaining features of a product and invite viewers to purchase the product by visiting a website or calling a call center.

However, conventional e-commerce platforms fail to provide an integrated environment for a consumer to learn about a product or service, and conduct transactions. Moreover, conventional e-commerce platforms are static with respect to the consumer's interest. That is, the e-commerce platforms have a certain content that is not modified based on a user's interest. In addition, conventional e-commerce platforms do not allow for the posting of live events, videos or other digital content explaining their experience with, or providing additional details about, the goods or services that are advertised.

Embodiments address these and other technical problems, individually and collectively.

BRIEF SUMMARY

Embodiments relate to the providing, accessing, monitoring and updating content on an e-commerce platform. Account managers (also referred as consultants) may upload digital content to the platform via their dedicated consultant interfaces and user (also referred as prospects) may access and/or interact with the digital content on the platform via their dedicated prospect interfaces. According to various embodiments, consultants may determine the digital content that will be uploaded on a particular prospect webpage. According to various embodiments, the prospect webpage may be updated to include a link to the digital content determined by the consultants. The prospect webpage may also be updated to remove a link from the prospect webpage. In some embodiments, contents of the prospect webpage and how the prospects interact with their prospect webpage may be monitored using a monitoring tool. The contents of the prospect webpage may be modified based on the monitoring. In some embodiments, the content may be modified automatically. In other embodiments, results of the monitoring and/or recommendations for modifying the content of the particular prospect webpage may be transmitted to the consultant paired with that prospect. The consultant may then update the contents of the prospect webpage based on the feedback provided by the monitoring tool.

Embodiments may provide a method for managing a plurality of interactive online user interfaces, each one of the plurality of interactive online user interfaces being accessible by a user, and representing a unique pairing between the user and a manager associated with the user. The method includes uploading, by a computer system, one or more links to a first set of digital content files to an interactive online user interface among the plurality of interactive online user interfaces according to a first criteria. A first set of digital content stored in the first set of digital content files is rendered on a user device of a user. The method may also include modifying, by the computer system, the interactive online user interface to add or remove a digital content file to obtain a second set of digital content files. The second set of digital content files conform to the first criteria. The method may further include uploading, by the computer system, one or more links to the second set of digital content files to the interactive online user interface. A second set of digital content stored in the second set of digital content files is rendered on the user device of the user. The first set of digital content files and the second set of digital content files each include one or more of a live event stream, a prerecorded video, a written article, a podcast, a chat interface, an interactive quiz. The method further includes receiving, by the computer system from the user device of the user, a request to conduct a transaction after the user interacts with the second set of digital content files. The method also includes processing, by the computer system, the transaction requested by the user. At least one of the first set of digital content files and the second set of digital content files may be selected by the manager associated with the user. In some embodiments, the computer system may automatically select at least one of the first set of digital content files and the second set of digital content files.

In some embodiments, the method may include rendering, by the computer system, one or more graphical icons on each one of the plurality of interactive online user interfaces, wherein the one or more graphical icons, when selected, send the request to conduct the transaction to the computer system.

The method may also include monitoring, by the computer system, how the user interacts with the first set of digital content on the interactive online user interface, wherein the user has exclusive access to the interactive online user interface. The interactive online user interface may be modified based on the monitoring. The method may also include selecting, by the computer system, at least one of the plurality of interactive online user interfaces based on the monitoring. The selected interactive online user interface exhibits an interaction with the user associated with the selected interactive online user interface above a predetermined threshold. The method may further include receiving, by the computer system, a plurality of digital content files associated with one or more products from a plurality of sources. One of the plurality of sources include the plurality of interactive online user interfaces. The method may also include storing, by the computer system, the plurality of digital content files at a storage server, the plurality of digital content files including the first set of digital content files and the second set of digital content files.

In some embodiments, the method may include accessing, by the computer system, a plurality of digital content files associated with one or more products stored on a cloud-based storage, the plurality of digital content files including the first set of digital content files and the second set of digital content files.

According to various embodiments, the method may include providing, by the computer system, feedback to the manager associated with the user about how the user interacts with the first set of digital content on the interactive online user interface; and receiving, by the computer system, the second set of digital content files from the manager.

Another embodiment of the invention is directed to a computer programmed to perform the above-noted method.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Embodiments relate to providing, accessing, monitoring and updating content on an e-commerce platform. The platform may have different user interfaces for consultants (e.g. account managers, managers) who may act on behalf of an entity to market a product provided by the entity, and for prospects (e.g. consumers, users) who are interested in learning more about the product, purchase the product and/or become part of the team to market the product. The consultants may upload digital content to the platform via their dedicated consultant webpages (referred also as consultant pages, or consultant interfaces) and the prospects may access and/or interact with the digital content on the platform via their dedicated prospect webpages (referred also as prospect pages, or prospect interfaces).

The digital content, as used herein, may include digital multimedia content, live videos, live streaming events, on-demand videos, chats (chat interfaces), written articles, interactive quizzes, messages, podcasts, etc. According to various embodiments, consultants may determine the digital content that will be uploaded on a particular prospect webpage. In some embodiments, contents of the prospect webpage and how an individual prospect interacts with their prospect webpage may be monitored. The contents of the prospect webpage may be updated based on the monitoring. In some embodiments, the content may be updated automatically. In other embodiments, results of the monitoring and/or recommendations for updating the content of the particular prospect webpage may be transmitted to the consultant paired with that prospect. The consultant may then update the contents of the prospect webpage based on the feedback provided by the monitoring system. In some embodiments, the new digital content and/or the link to the new digital content may be sent to the prospects via email or other messaging mediums including but not limited to live calls, text messages, and social media messages. Alternatively, the new digital content may be uploaded to the prospect webpage, and the prospect may be notified of the updated (e.g. modified) content of the prospect webpage via email or other messaging mediums including but not limited to live calls, text messages, and social media messages.

Figure 1:
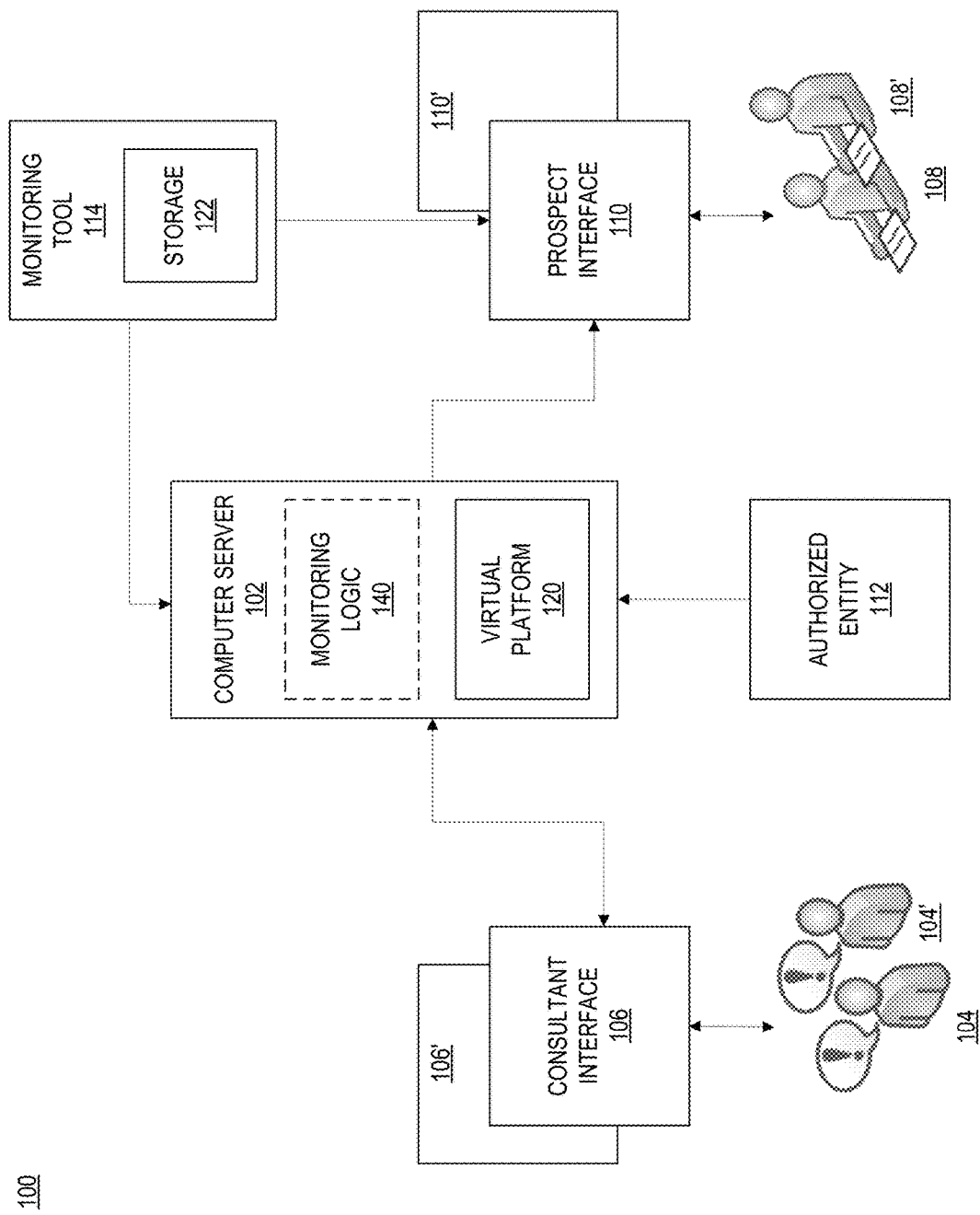
FIG. 1 illustrates an exemplary system for providing, accessing, monitoring and updating content on an e-commerce platform, in accordance with various embodiments.

FIG. 1 illustrates an exemplary e-commerce platform content providing and monitoring system 100 according to various embodiments. The system 100 may include a computer server 102 for storing and providing digital content. According to various embodiments, the computer server 102 may be a remote server with respect to the consultants and/or the prospects. In some embodiments, the computer server 102 may be a cloud computing device.

Consultants 104, 104' may interact with the server 102 through dedicated consultant interfaces 106, 106', respectively. For example, a consultant 104 may register with the server 102 and obtain a unique consultant identifier (e.g. a consultant ID). According to various embodiments, the consultant may need to provide a predetermined set of information (e.g. name, contact information such as telephone number, an e-mail address, a social network account identifier, mailing address, etc.) in order to obtain the consultant identifier. The information provided by the consultant may be stored at a storage (e.g. memory 204 illustrated in FIG. 2) of the computer server 102 or at a remote storage (e.g. storage 122).

A dedicated consultant interface 106, such as a consultant webpage, may be generated for that consultant 104. The consultant webpage may be associated with the unique consultant ID. According to various embodiments, the consultant 104 may upload digital content to the server 102 via the consultant interface 106. The digital content uploaded by the consultant 104 may be stored at the server 102 and made available to one or more prospects 108. In some embodiments, the digital content may be stored in libraries on the server 102 (e.g. at content storage 210 illustrated in FIG. 2). As used herein, the digital content may refer to a computer file (e.g. a digital content file) storing the digital content. When a link to the computer file is selected (e.g. activated or executed), the digital content stored in the computer file may be displayed, played, executed or otherwise rendered on an output device (e.g. a personal computer, a user communication device, a tablet computer, a smart watch).

In some embodiments, the digital content uploaded to the server 102 by a first consultant 104 may be made available to prospect(s) associated (e.g. paired) with the first consultant 104. Alternatively, all or a portion of the digital content uploaded to the server 102 by the first consultant 104 may be made available to all prospects and/or other consultants registered (e.g. associated) with the server 102.

Prospects 108, 108' may interact with the server 102 through dedicated prospect interfaces 110, 110', respectively. For example, a first consultant 104 may register a first prospect 108 with the server 102. The server 102 may then issue a first unique prospect identifier (e.g. prospect ID) to the first prospect 108 that is based, at least in part, on the pairing between the first consultant 104 and the first prospect 108. According to various embodiments, the prospect may need to provide a predetermined set of information (e.g. name, contact information such as telephone number, an e-mail address, a social network account identifier, mailing address, etc.) in order to obtain the prospect identifier. The information provided by the prospect may be stored at the storage (e.g. memory 204 illustrated in FIG. 2) of the computer server 102 or at a remote storage (e.g. storage 122).

A dedicated prospect interface 110, such as a first prospect webpage, may be generated for the first unique prospect ID. If the first prospect 108 also gets registered with the server 102 though a second consultant 104', a second unique prospect ID may be issued for the first prospect 108 based, at least in part, on the pairing between the second consultant 104' and the first prospect 108. Similarly, if the first consultant 104 registers a second prospect 108' with the server 102, a third unique prospect ID may be issued for the second prospect 108' based, at least in part, on the pairing between the second prospect 108' and the first consultant 104. Thus, a prospect ID may identify the prospect, as well as the unique pairing between the prospect and a unique consultant.

According to various embodiments, the prospect 108 may access the digital content via the prospect interface 110. In some embodiments, the prospect 108 may only access the digital content that was pushed to the prospect interface 110 or the prospect webpage by the server 102 and/or by the consultant 104 paired with the prospect 108. The prospects 108, 108' may not be allowed to upload digital content to the server 102. According to various embodiments, the prospects 108, 108' may interact with the server 102 and/or the consultants 104, 104' via chats, messages, etc. that is supported by the server 102.

An exemplary prospect interface 110 or prospect webpage may have a predetermined content criteria. For example, the exemplary prospect interface 110 may include a first predetermined number of video content, a second predetermined number of chats, etc. Alternatively, the predetermined content criteria may require that a first portion (e.g. percentage) of the digital content to be video content, a second portion of the digital content to be written content, etc. Accordingly, the digital content pushed to the prospect interface 110 may be subject to (e.g. limited by) the predetermined content criteria.

According to some embodiments, only a subset of digital content stored on the server 102 may be available to a given prospect 108 based on, for example, the interests of that prospect. In some embodiments, only a portion of the subset of digital content may be pushed to the prospect interface 110 of the given prospect 108 at a given time based on the predetermined criteria associated with prospect interface 110. This may prevent cluttering of the prospect interface 110 with abundant information. The predetermined content criteria is aimed to optimize the content of, and prospect experience on, the prospect webpage.

According to various embodiments, the digital content stored on the server 102 may be pulled to the prospect interface 110 by (or based on the request of) the prospect 108. Alternatively, the digital content stored on the server 102 may be pushed to the prospect interface 110 by the server 102, or by the consultant 104 paired with the prospect 108. In some embodiments, push from the server 102 may be limited to the predetermined criteria, whereas pull from the server 102 by the prospect 108 may not be subject to any limitations including the predetermined criteria. Accordingly, the prospect 108 may be able to customize the content on the prospect interface 110 based on their request, as opposed to a predetermined criteria.

According to various embodiments, an authorized entity 112 may also upload digital content to the server 102. The authorized entity 112 may be a manager of the system 100. In some embodiments, the authorized entity 112 may have override authority that overrides any uploads or other actions by consultants and/or prospects. The authorized entity 112 may add or remove digital content from the server 102.

For example, the authorized entity 112 may upload a live event (e.g. a live streaming event) to the server 102. The plurality of consultants 104 and/or the plurality of prospects 108 may access (e.g. stream) the live event simultaneously. The access to the live event may be based on invitation and the access may be monitored (e.g. the authorizing entity may track and gather information about who is accessing the live event). In some embodiments, the live-stream event may be recorded and stored in form of an on-demand video content on the server 102. The plurality of consultants 104 and/or the plurality of prospects 108 may access (e.g. stream) the on-demand video content from the server 102 when they chose.

The exemplary e-commerce platform content providing and monitoring system 100 may also include a monitoring tool 114 for monitoring how each prospect 108 interacts with their unique prospect interface 110. For example, the monitoring tool 114 may monitor how many times a given prospect 108 viewed video content on/via the prospect interface 110, or how many times the given prospect 108 accessed chats, messages on/via the prospect interface 110. Based on that monitoring, the monitoring tool 114 may provide recommendations about digital content that would increase the interaction of the prospect with the prospect interface 110. For example, if a particular prospect 108 watches more videos than reading (e.g. clicking on, retrieving) articles, than the monitoring tool 114 may recommend replacing the articles with additional videos. In some embodiments, the monitoring tool 114 may modify (or may recommend the modification to the authorized entity 112) the predetermined content criteria for the prospect interface 110. For example, the monitoring tool 114 may decrease the article content allocation for the prospect interface while increasing the video content allocation. In some embodiments, the monitoring tool 114 may be implemented as a monitoring logic 140 on the computer server 102.

In some embodiments, the monitoring tool 114 may provide recommendations to the server 102 (or the authorized entity 112) for automatically (e.g. dynamically) updating the content of the particular prospect interface 110. Alternatively, the monitoring tool 114 may provide the recommendations to consultant 104 paired with the prospect 108 associated with the particular prospect interface 110 for the consultant 104 to update the content of the particular prospect interface 110. In some embodiments, the tool 114 may provide the recommendations to consultant 104 via the server 102.

The server 102 illustrated in FIG. 1 may include a virtual platform 120 that may store the user interfaces that incorporate at least a portion of the digital content uploaded by the consultants and one or more authorized entities, store user information about the consultants and/or the prospects, serve as an intermediary to support interaction and/or communication between the consultants and prospects, serve as an intermediary to support interaction and/or communication among the consultants, serve as an intermediary to support interaction and/or communication between the consultants and an authorized entity (e.g. an entity managing the server).

In some embodiments, information collected from the consultants and/or the prospects (e.g. contact information, name, address, e-mail address, etc.) may be stored at a cloud storage or remote storage 122 managed by the monitoring tool 114 as well as the server 102 (e.g. the virtual platform 120). According to some embodiments, the monitoring tool 114 (or the monitoring logic 140) may confirm the validity or accuracy of the data before sending the data to the server 102. The data may be stored at both locations (e.g. the server 102 and the storage associated with the monitoring tool 112) for redundancy purposes.

According to some embodiments, the monitoring tool 114 may also monitor interaction (e.g. touches) associated with the consultant ID or the prospect ID. That is, the monitoring tool 114 may monitor any interaction between the virtual platform 120 and the consultants 104 and/or the prospects 108. The monitored interaction may be analyzed to determine quantitative measures (e.g. propensities) about the prospect 108 (e.g. the likelihood of the prospect 108 to conduct a transaction and/or to become a consultant 104), as discussed in greater detail below.

According to various embodiments, the exemplary e-commerce platform content providing and monitoring system 100 may also support performing transactions through the platform. For example, a prospect 108 may request to conduct a transaction (e.g. purchase a product) via the prospect interface 110. The transaction (e.g. the product) may be associated with the digital content made available on the prospect interface 110. For example, a video content on the prospect interface 110 may be a promotional video or an information video about the product that the prospect may purchase after viewing the video content. As discussed below in greater detail in connection with FIG. 4, the prospect 108 may be directed to a product website (e.g. the website of the entity managing the exemplary e-commerce platform content providing and monitoring system 100) for the prospect 108 to select an item or a service to purchase, and provide payment credentials to complete the transaction.

Figure 2:
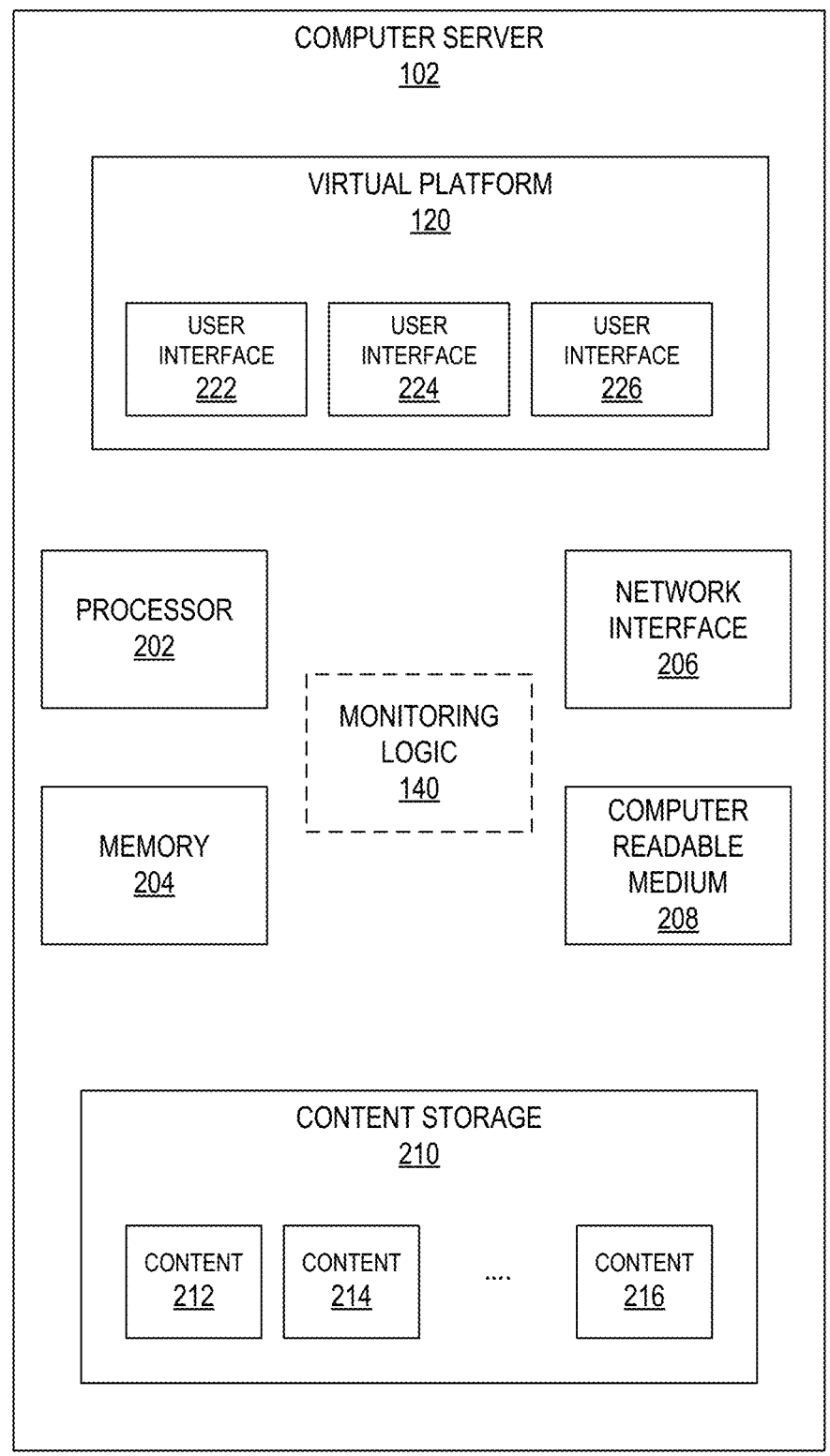
FIG. 2 illustrates a block diagram of a computer server, in accordance with various embodiments.

FIG. 2 illustrates a block diagram of the computer server 102 according to various embodiments. The computer server 102 may comprise a server coupled to a network interface (e.g., by an external communication interface), and databases of information. The computer server 102 may comprise at least one processor 202. In some embodiments, the server 102 may include a plurality of processors. The processor 202 may be coupled to a memory 204, a network interface 206, and a non-transitory computer readable medium 208 comprising, in some embodiments, various modules to implement the methods discussed herein. The computer server 102 may include a content storage 210 for storing the digital content 212, 214, 216. In some embodiments, the content storage 210 may be a remote storage to the computer server 102. The computer server 102 may include a virtual platform 120 that stores and/or makes available a plurality of interactive online user interfaces 222, 224 and 226. One of ordinary skill in the art will appreciate that the virtual platform may store and/or make available any number of user interfaces. Each one of the plurality of interactive online user interfaces may be accessible by a unique prospect (e.g. user), and may represent a unique pairing between the prospect and a consultant (e.g. manager) associated with the user. According to various embodiments, an exemplary interactive online user interface 222 may include one or more links to a first set of digital content files. In some embodiments, the digital content files may be selected according to a predetermined criteria. When a prospect interacts with the interactive online user interface 222, the first set of digital content stored in the first set of digital content files is rendered on the user device of the prospect.

In some embodiments, the computer server 102 may include monitoring logic 140 that monitors how a prospect interacts with the interactive online user interface. The digital content files included in the interactive online user interface 222 may be modified based on the monitoring, as described below.

According to various embodiments, the computer readable medium 208 may comprise code, executable by the processor 202, to implement a method comprising: uploading one or more links to a first set of digital content files to an interactive online user interface among the plurality of interactive online user interfaces according to a first criteria; modifying the interactive online user interface to add or remove a digital content file to obtain a second set of digital content files; uploading one or more links to the second set of digital content files to the interactive online user interface; receiving, from the user device of the user, a request to conduct a transaction after the user interacts with the second set of digital content files; and processing the transaction requested by the user.

Consultant Interface (Consultant Webpage)

As discussed above, the consultants (e.g. managers) 104 may interact with the server 102 though consultant interfaces 106.

Figure 3:
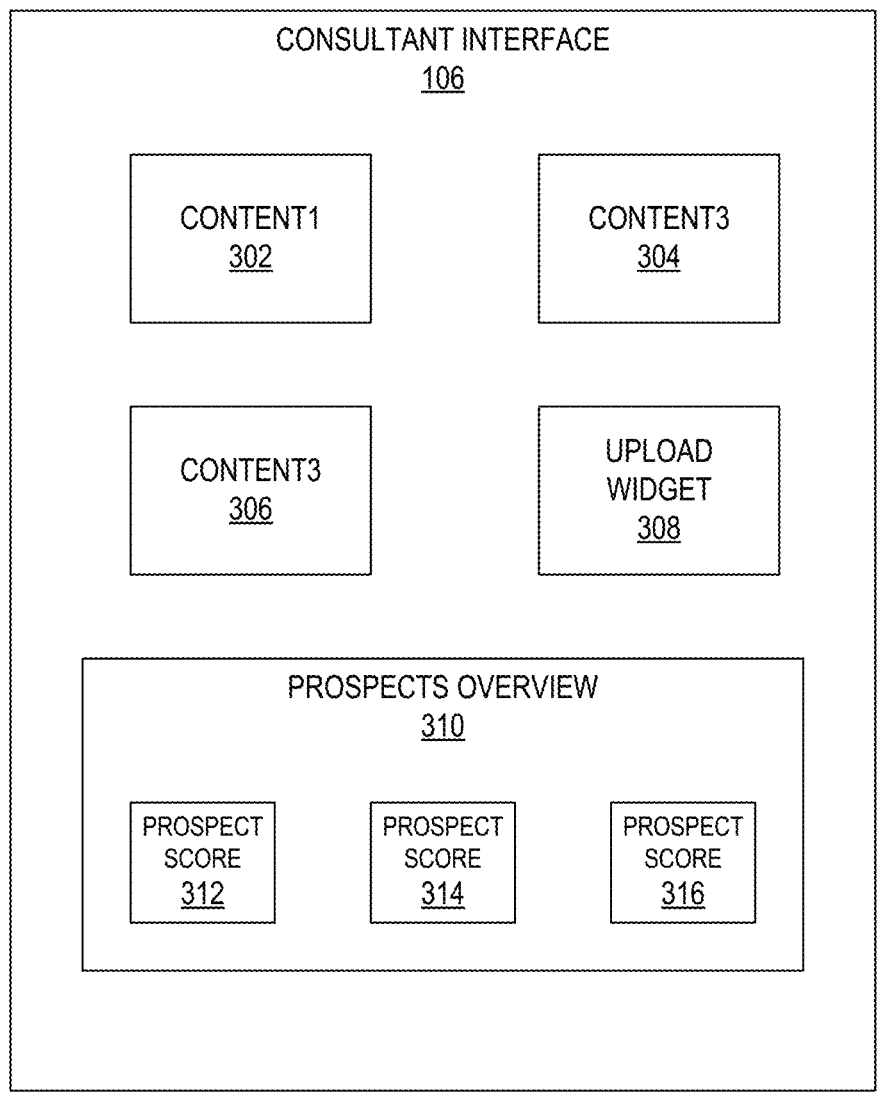
FIG. 3 illustrates an exemplary interactive online manager interface (e.g. a consultant interface or a consultant webpage), in accordance with various embodiments.

FIG. 3 illustrates an exemplary interactive online manager interface (e.g. a consultant interface or a consultant webpage) 106 according to various embodiments. As used herein, an interface may refer to a graphical user interface that allows access to a webpage, as well as the webpage itself. When a consultant 104 registers with the server 102, the consultant may be issued a unique consultant ID. Each unique consultant ID may be associated with a unique consultant interface 106.

The consultant interface 106 may include a plurality of digital content 302, 304, 306 either automatically selected and uploaded (from the server 102) by the system 100 and/or selected by the consultant 104 associated with the consultant interface 106. According to various embodiments, the digital content 302, 304, 306 may include a live event stream, a pre-recorded video, a written article, a podcast, a chat interface, an interactive quiz, content uploaded by other consultants, etc. For example, the system 100 may select a digital content that have been popular among (e.g. viewed by a high number of) consultants. The system may then upload the selected digital content to the consultant interface 106. The system 100 may keep track of the content viewed by the consultant and may not recommend content that has been previously viewed by the consultant. The content displayed on the consultant interface 106 may also include videos and/or articles about business development, recognitions, awards, activities of other consultants in a team, tips about generating digital content, etc.

In some embodiments, the digital content 302, 304, 306 may be displayed simultaneously on the consultant interface 106. Alternatively, each digital content 302, 304, 306 may be displayed as a separate page accessed via the consultant interface 106. That is, the consultant interface 106 may provide access to a series of webpages.

The consultant interface 106 may also include an upload widget 308 that allows the consultant 104 to upload digital content to the server 102. For example, one or more of the digital content 302, 304, 306 may have been uploaded to the server 102 via the consultant interface 106 using the upload widget 308. The upload widget 208 may allow the consultant to record and/or live-stream videos that are accessible by other consultants and prospects via the server 102.

In some embodiments, the consultant may have an offline interaction with one of the prospects associated with the consultant. The consultant may upload information about the offline interaction to the consultant interface 106. For example, the consultant may use the upload widget 308 to provide a written memo, an audio or a video summarizing the offline interaction. The offline interaction may be considered by the monitoring tool 114 or the monitoring logic 140 of the server 102 when assessing the prospect (e.g. when assessing the touches of that prospect).

According to various embodiments, the consultant interface 106 may enable the consultant to invite people (e.g. other consultants, prospects or people not yet registered with the system) to access the digital content uploaded to the server 102 by the consultant 104. The invitees who are not already registered with the system may register and create a profile with the server 102 to become a prospective consultant or a prospective customer. Upon registering, the invitees may access the digital content uploaded by the consultant 104 via their dedicated prospect interface (e.g. the interactive online user interface accessible by the prospect, and representing a unique pairing between the prospect and a consultant associated with the prospect) or consultant interface. The system may track the access to the digital content and determine identifying information about people (prospects, consultants, etc.) accessing the digital content.

According to various embodiments, a consultant may be paired with one or more prospects. Each prospect may have a unique interactive online user interface that is associated with that prospect and the consultant. Each unique interactive online user interface may be associated with a unique identifier. The system may monitor each prospect's interaction with their dedicated prospect interface and determine a score for the prospect. The score may be indicative of how much the prospect interacts with contents of the prospect interface and/or the likelihood of the prospect to become a consultant, the likelihood of the prospect to conduct a transaction. The score(s) of the prospect(s) paired with the consultant may be displayed on a prospects overview window 310 of the consultant interface 106. The prospects overview window 310 may be displayed along with other content or by itself. In some embodiments, the prospects overview window 310 may display the scores for a plurality of prospects associated with the consultant 104 in form of tiles 312, 314, 316 where each tile represents a single prospect. In other embodiments, the prospects overview window 310 may display the scores for the plurality of prospects associated with the consultant 104 in form of a list. The consultant may select a tile, or an entry on the list, and access additional details about the prospect whose score is represented by the tile or the entry. For example, the additional details may include a contact information, a summary of the prospect's interaction with the prospect interface (e.g. how many times the prospect viewed videos, read articles, sent messages, viewed a particular product, etc.). Based on the information provided in the prospects overview window 310, the consultant may update the contents of a particular prospect interface, identify a prospect as more likely to become a consultant and/or make a purchase, etc.

Prospect User Interface (Prospect Webpage)

As discussed above, the prospects 108 may interact with the server 102 though prospect interfaces 110.

Figure 4:
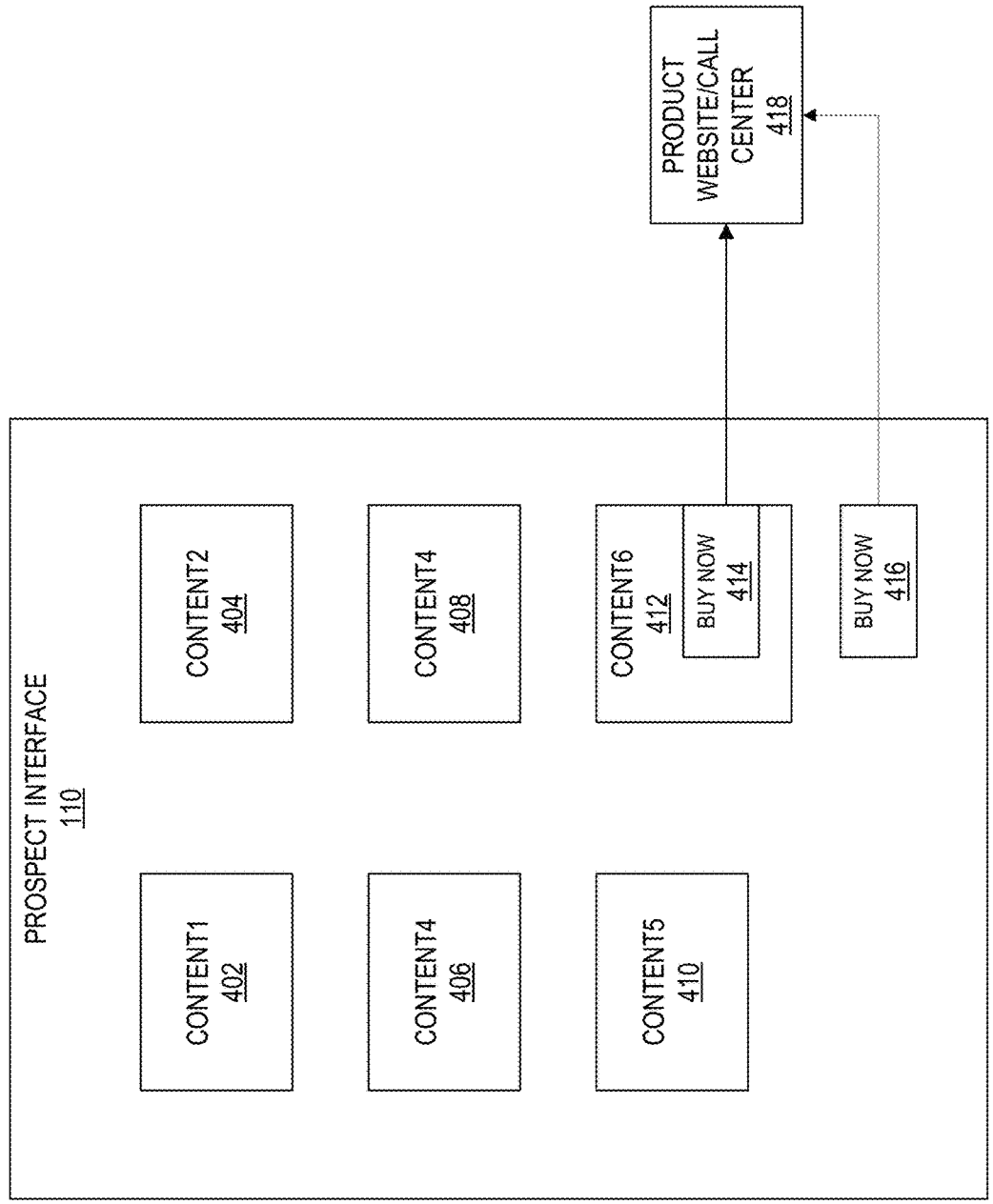
FIG. 4 illustrates an exemplary interactive online user interface (e.g. a prospect interface or a prospect webpage), in accordance with various embodiments.

FIG. 4 illustrates an exemplary interactive online user interface (e.g. prospect user interface or prospect webpage) 110 according to various embodiments. As used herein, an interface may refer to a graphical user interface that allows access to a webpage, as well as the webpage itself. When a prospect registers with the server 102, the prospect may be issued a unique prospect identifier (e.g. prospect ID). The unique prospect ID may identify a unique prospect-consultant pair. That is, the unique prospect ID may identify the prospect as well as the consultant assigned to, or otherwise associated with, the prospect. For example, in order to register with the server 102 as a prospect, a person or an entity may have to provide a predetermined set of information (e.g. one or more of name, e-mail address, phone number, mailing address, social media user name, handle). Each unique prospect ID may be associated with a unique prospect user interface 110.

The prospect user interface 110 may include a plurality of digital content 402, 404, 406, 408, 410 either automatically selected and uploaded by the system 100 and/or selected by the consultant assigned to the prospect associated with the prospect interface 110. According to various embodiments, the digital content 402, 404, 406, 408, 410 may include one or more of a live event stream, a pre-recorded video, a written article, a podcast, a chat interface, an interactive quiz uploaded by the consultant associated with the prospect, and/or uploaded by other consultants.

According to various embodiments, the digital content 402, 404, 406, 408, 410 may be selected according to a predetermined criteria. For example, the predetermined criteria may require that a first portion of the digital content 402, 404, 406, 408, 410 include video content, and a second portion of the digital content 402, 404, 406, 408, 410 include written articles.

In some embodiments, the digital content 402, 404, 406, 408, 410 may be displayed simultaneously on the prospect interface 110. Alternatively, each digital content 402, 404, 406, 408, 410 may be displayed as a separate page accessed via the prospect interface 110. That is, the prospect interface 110 may provide access to a series of webpages.

The prospect interface 110 may also include a widget (e.g. a buy now button) 416 that directs the prospect to a product website or a call center 418 that may allow the prospect to conduct a transaction (e.g. buy products advertised by the digital content 402, 404, 406, 408, 410). According to various embodiments, the widget 414 may be embedded within a content 412. For example, the widget 414 may be overlaid on a pre-recorded or live-streaming video. Upon selecting (or activating) the widget 414, the video may be paused and the prospect may be directed to the product website 418. In some embodiments, the video may continue streaming or playing. The widget 416 is an exemplary graphical icon rendered on the prospect interface and that various alternative graphical icons may be used. The graphical icon, when selected, may send a request to conduct the transaction to a computer system (e.g. system 100).

According to various embodiments, when a digital content is output (e.g. displayed, rendered, played) on the prospect interface 110, contextual content may be output along with the digital content. The contextual content may give additional information about the digital content, for example details about a product, popularity of the product, etc. In some embodiments, the contextual content may be customized based on the geographical location of the prospect viewing the digital content on the prospect interface 110. For example, the language of the contextual content may be modified according to the geographical location of the prospect. In addition, the contextual content may be modified according to a climate of the geographical location of the prospect.

Prospect Interaction Monitoring/Prospecting Algorithm

As provided above, the monitoring tool 114 of the exemplary e-commerce platform content providing and monitoring system 100 (or the monitoring logic 140 of the computer server 102) may monitor how each prospect 108 interacts with their unique prospect interface 110 (e.g. the interactive online user interface). For example, the monitoring tool 114 may monitor how many times a given prospect 108 viewed video content on/via the prospect interface 110, or how many times the given prospect 108 accessed chats, messages on/via the prospect interface 110. Based on that monitoring, the monitoring tool 114 (or the monitoring logic 140) may provide recommendations about digital content that would increase the interaction with the prospect interface 110. In some embodiments, the monitoring tool 114 may provide the recommendations to the server 102 for automatically (e.g. dynamically) updating the content of the particular prospect interface 110. Alternatively, the monitoring tool 114 may provide the recommendations to the consultant 104 paired with the prospect 108 associated with the particular prospect interface 110 for the consultant 104 to update the content of the particular prospect interface 110. In some embodiments, the monitoring tool 114 may provide the recommendations to consultant 104 via the server 102.

According to various embodiments, the monitoring tool 114 may provide recommendations based on accumulative history of a particular prospect 108. The monitoring tool 114 may execute a machine learning algorithm that would allow the tool to learn the behavior of a particular prospect 108 and predict digital content more likely to be of interest to that particular prospect 108. Accordingly, the content of the prospect page may also be updated using information from predictive machine learning algorithms.

The monitoring tool 114 may perform a method (e.g. run an algorithm) that identifies prospects that are likely to perform a transaction. The method and/or the algorithm may include a prospecting portion. For example, as part of the prospecting algorithm, the monitoring tool 114 may generate a score for each prospect 108 based on the monitoring how the prospect 108 interacts with the prospect interface 110. An exemplary score may be determined by identifying factors (e.g. times videos watched, times articles clicked, times prospect logged in to the prospect interface), identifying a weight for each factor, and calculating the score using, for example, a weighted sum formula such as $$(\Sigma)^2 = (a(x)^\alpha + b(y)^\beta + c(z)^\gamma + \ldots + n(m)^\tau)^2.$$

The monitoring tool 114 may then provide the scores to the server 102 (or the monitoring logic 140 may provide the scores to the processor 202 of the computer server 102). The scores for prospects associated with a given consultant may be displayed on the prospect overview window of the consultant interface of the consultant.

Figure 5:
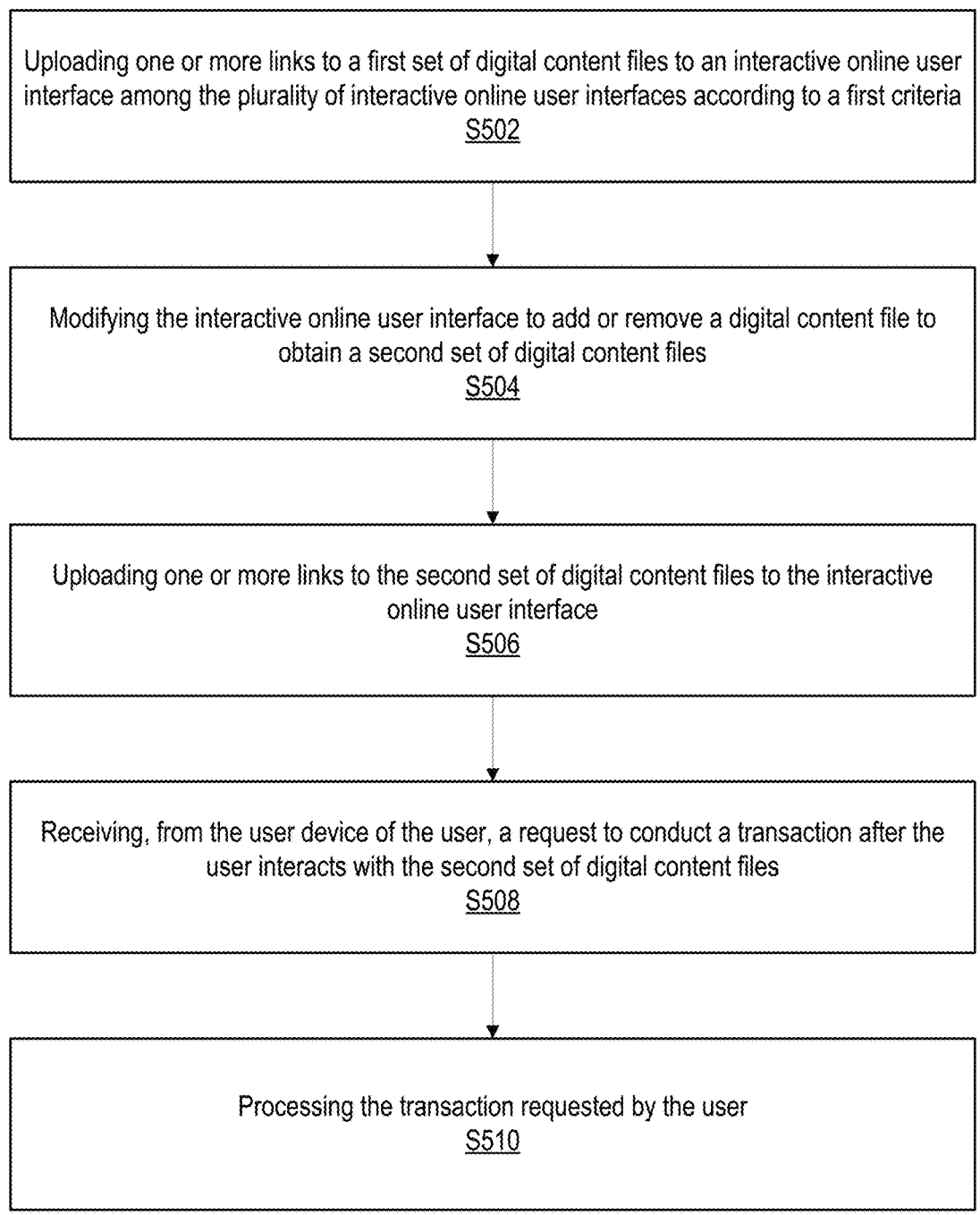
FIG. 5 illustrates a flowchart of steps for providing, accessing, monitoring and updating content on an e-commerce platform, in accordance with various embodiments.

According to various embodiments, the system 100 illustrated in FIG. 1 may implement a method for managing a plurality of interactive online user interfaces, each one of the plurality of interactive online user interfaces being accessible by a user, and representing a unique pairing between the user (e.g. prospect) and a manager (e.g. consultant) associated with the user, as illustrated in FIG. 5.

At step S502, the system may upload one or more links to a first set of digital content files to an interactive online user interface among the plurality of interactive online user interfaces according to a first criteria (e.g. predetermined combination of videos, articles, chat interfaces, . . . ). A first set of digital content stored in the first set of digital content files is rendered on a user device of a user (e.g. prospect). At some point before uploading the links, the system may receive a plurality of digital content files associated with one or more products from a plurality of sources. For example, the system may receive the digital content files from the consultants or the authorized entities. The plurality of digital content files may include one or more of a live event stream, a pre-recorded video, a written article, a podcast, a chat interface, an interactive quiz. According to various embodiments, the system may store the plurality of digital content files at a storage server. The storage server may be a local server or a cloud storage accessible by the system. Thus, the system may access the remote or cloud storage to retrieve the plurality of digital content files. The plurality of digital content files including the first set of digital content files and the second set of digital content files.

According to various embodiments, the system may monitor how the user interacts with the first subset of digital content on the interactive online user interface. The user may have exclusive access to the interactive online user interface. For example, the interactive online user interface may password-protected and may be accessed by providing a username and password combination known only to the user.

According to some embodiments, the system may select at least one of the plurality of interactive online user interfaces based on the monitoring. The selected interactive online user interface exhibits an interaction with the user associated with the selected interactive online user interface above a predetermined threshold. The monitoring may also be used to determine a score for the user. Once the score is determined (e.g. calculated), the score associated with the user may be displayed on the interactive online manager interface of the manager associated with the user.

At step S504, the system may modify the interactive online user interface to add or remove a digital content file to obtain a second subset of digital content files based on the monitoring. The second subset of digital content files may also conform to the first criteria. In some embodiments, at least one of the first subset of digital content files and the second subset of digital content files are selected by a manager associated with the unique user. According to various embodiments, the system may provide feedback to the manager associated with the user about how the user interacts with the first subset of digital content on the interactive online user interface. The system may then receive the second subset of digital content files from the manager. In yet other embodiments, the system may select at least one of the first subset of digital content files and the second subset of digital content files. In some embodiments, the interactive online user interface may be modified based on the monitoring.

At step S506, the system may upload one or more links to the second subset of digital content files to the interactive online user interface. A second subset of digital content stored in the second subset of digital content files is rendered on the computing device of the user. According to various embodiments, the first subset of digital content files and the second subset of digital content files may be mutually exclusive. That is, the system may track the digital content that was previously viewed by the prospect and may only send new digital content to the prospect page.

According to various embodiments, the system may render one or more graphical icons on each one of the plurality of interactive online user interfaces. The one or more graphical icons, when selected, send a request to conduct a transaction to the system. At step S508, the system may receive the request to conduct the transaction from the user device after the user interacts with the second subset of digital content files. At step S510, the system may process the transaction requested by the user.

In some embodiments, the system may manage a plurality of interactive online manager interfaces (e.g. consultant interfaces). Each one of the plurality of interactive online manager interfaces may be associated with a unique manager associated with a set of users. The system may determine a score for each of the set of users based on monitoring interaction of the set of users with interactive online user interfaces associated with the set of users. The system may display the score associated with each one of the set of users on the interactive online manager interface of the manager associated with the set of users. According to various embodiments, the system may select at least one of the plurality of interactive online user interfaces based on the monitoring. The selected interactive online user interface exhibits an interaction with the user associated with the selected interactive online user interface above a predetermined threshold. That is, the system may identify the prospect interface(s) that are more likely to lead to a transaction based on a level of interaction with the identified prospect interfaces. The level of interaction may be compared to a predetermined threshold in determining whether the prospect interface is to be identified as more likely to lead to a transaction.

The commerce platform content providing and monitoring system discussed herein provides an integrated and seamless environment supporting e-commerce while at the same allowing streamlined communication and access to information by all users of the system (e.g. consultants, prospects and authorized entities managing or supervising the system). The server or the virtual platform simultaneously supports access to digital content and ability to conduct transactions. The system described herein may be used to promote, advertise, market and sell a wide variety of goods and services including but not limited to cosmetics, clothing, entertainment, home goods, supplements, as well as consulting services associated with any of these items.

Figure 6:
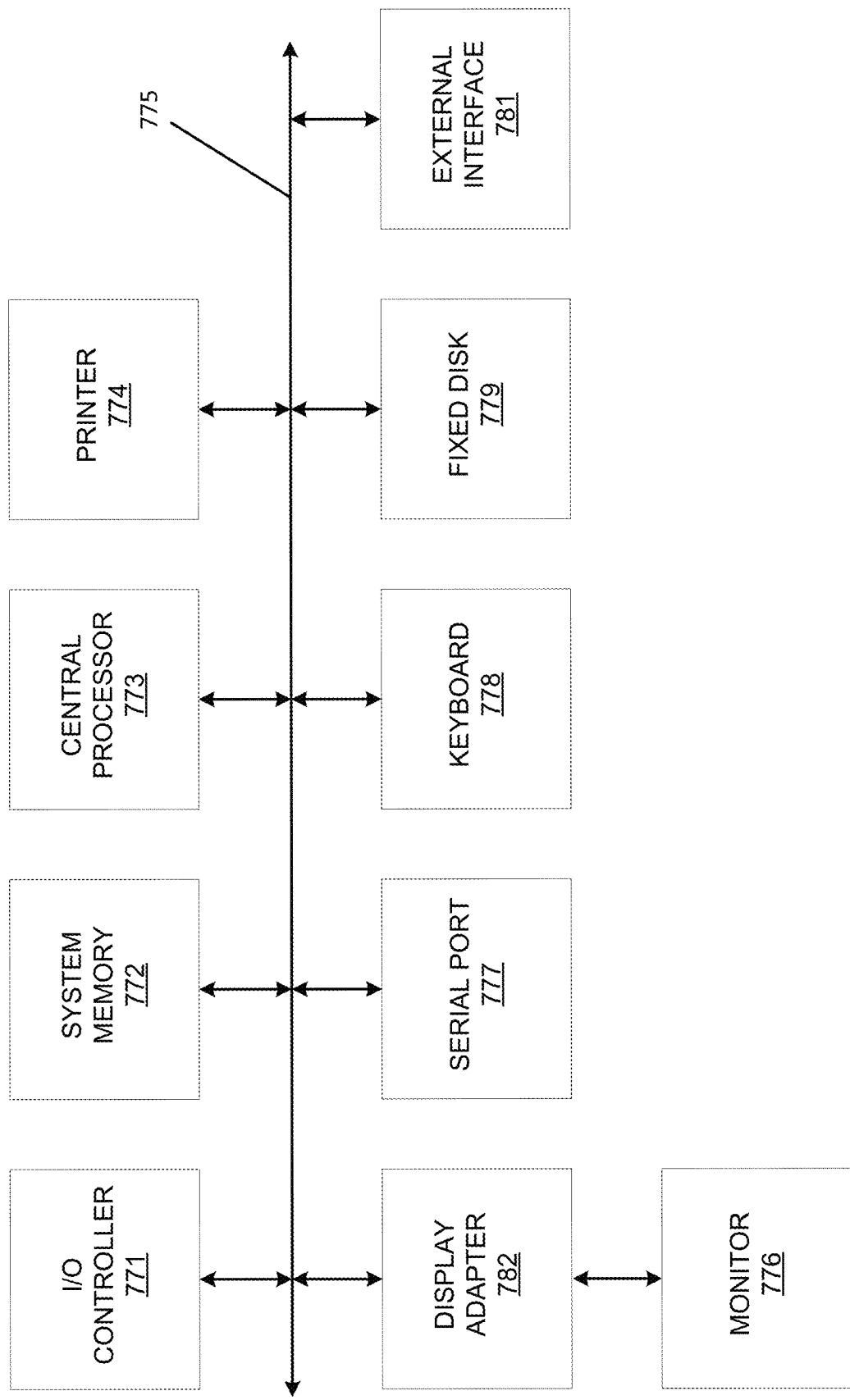
FIG. 6 illustrates shows an exemplary computer system, in accordance with various embodiments.

A portion of the subsystems or components of an exemplary computer apparatus are shown in FIG. 6. The subsystems shown in FIG. 6 are interconnected via a system bus 775. The subsystems such as a printer 774, keyboard 775, fixed disk 779 (or other memory comprising computer-readable media), monitor 776, which is coupled to a display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody computer-readable medium.

The computer system described herein is then used to provide, access, monitor and update content on an e-commerce platform in accordance with embodiments of the invention.

Specific details regarding some of the above-described aspects are provided above. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

The disclosure includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method for managing a plurality of interactive online user interfaces, each one of the plurality of interactive online user interfaces being accessible by a user, and representing a unique pairing between the user and a manager associated with the user, the method comprising:

uploading, by a computer system, one or more links to a first set of digital content files to an interactive online user interface among the plurality of interactive online user interfaces according to a first criteria, wherein a first set of digital content stored in the first set of digital content files is rendered on a user device of a user;

monitoring, by the computer system, how the user interacts with the first set of digital content on the interactive online user interface, wherein the user has exclusive access to the interactive online user interface;

identifying, by the computer system, a media type of digital content to add or remove from the interactive online user interface based on the monitoring;

modifying, by the computer system based on the monitoring, the interactive online user interface to add or remove a digital content file of the identified media type to obtain a second set of digital content files, wherein the second set of digital content files conform to the first criteria;

uploading, by the computer system, one or more links to the second set of digital content files to the interactive online user interface, wherein a second set of digital content stored in the second set of digital content files is rendered on the user device of the user, wherein the second set of digital content includes a live event stream;

rendering, by the computer system, one or more graphical icons on the live event stream, wherein the one or more graphical icons, when selected by the user, send a request to conduct a transaction to the computer system;

receiving, by the computer system from the user device of the user, the request to conduct the transaction while the user views the live event stream; and processing, by the computer system, the transaction requested by the user.

2. The method of claim 1, wherein the first set of digital content files and the second set of digital content files each include one or more of the live event stream, a pre-recorded video, a written article, a podcast, a chat interface, an interactive quiz.

3. The method of claim 1, further comprising:

selecting, by the computer system, at least one of the plurality of interactive online user interfaces based on the monitoring, wherein the selected interactive online user interface exhibits an interaction with the user associated with the selected interactive online user interface above a predetermined threshold.

4. The method of claim 1, further comprising:

determining a score for the user based on the monitoring; and displaying the score associated with the user on an interactive online manager interface of the manager associated with the user.

5. The method of claim 4, further comprising:

receiving, by the computer system, a plurality of digital content files associated with one or more products from a plurality of sources, wherein one of the plurality of sources include the plurality of interactive online user interfaces; and storing, by the computer system, the plurality of digital content files at a storage server, the plurality of digital content files including the first set of digital content files and the second set of digital content files.

6. The method of claim 1, further comprising:

accessing, by the computer system, a plurality of digital content files associated with one or more products stored on a cloud-based storage, the plurality of digital content files including the first set of digital content files and the second set of digital content files.

7. The method of claim 1, wherein at least one of the first set of digital content files and the second set of digital content files are selected by the manager associated with the user.

8. The method of claim 1, further comprising:
providing, by the computer system, feedback to the manager associated with the user based on the monitoring.

9. The method of claim 1, further comprising:
selecting, by the computer system, at least one of the first set of digital content files and the second set of digital content files.

10. A computer system for managing a plurality of interactive online user interfaces, each one of the plurality of interactive online user interfaces being accessible by a user, and representing a unique pairing between the user and a manager associated with the user, the computer system comprising:
one or more processors; and
a memory storing computer-executable instructions that, when executed by the one or more processors, cause the one or more processors to:
upload one or more links to a first set of digital content files to an interactive online user interface among the plurality of interactive online user interfaces according to a first criteria, wherein a first set of digital content stored in the first set of digital content files is rendered on a user device of a user;
monitor how the user interacts with the first set of digital content on the interactive online user interface, wherein the user has exclusive access to the interactive online user interface;
identify a media type of digital content to add or remove from the interactive online user interface based on the monitoring;
modify, based on the monitoring, the interactive online user interface to add or remove a digital content file of the identified media type to obtain a second set of digital content files, wherein the second set of digital content files conform to the first criteria;
upload one or more links to the second set of digital content files to the interactive online user interface, wherein a second set of digital content stored in the second set of digital content files is rendered on the user device of the user, wherein the second set of digital content includes a live event stream;
render one or more graphical icons on the live event stream, wherein the one or more graphical icons, when selected by the user, send a request to conduct a transaction to the computer system;
receive, from the user device of the user, the request to conduct the transaction while the user views the live event stream; and
process the transaction requested by the user.

11. The computer system of claim 10, wherein the first set of digital content files and the second set of digital content files each include one or more of the live event stream, a pre-recorded video, a written article, a podcast, a chat interface, an interactive quiz.

12. The computer system of claim 10, wherein the instructions, when executed by the one or more processors, further cause the one or more processors to:
select at least one of the plurality of interactive online user interfaces based on the monitoring, wherein the selected interactive online user interface exhibits an interaction with the user associated with the selected interactive online user interface above a predetermined threshold.

13. The computer system of claim 10, wherein the instructions, when executed by the one or more processors, further cause the one or more processors to:
determine a score for the user based on the monitoring; and
display the score associated with the user on an interactive online manager interface of the manager associated with the user.

14. The computer system of claim 13, wherein the instructions, when executed by the one or more processors, further cause the one or more processors to:
receive a plurality of digital content files associated with one or more products from a plurality of sources, wherein one of the plurality of sources include the plurality of interactive online user interfaces; and
store the plurality of digital content files at a storage server, the plurality of digital content files including the first set of digital content files and the second set of digital content files.

15. The computer system of claim 10, wherein the instructions, when executed by the one or more processors, further cause the one or more processors to:
access a plurality of digital content files associated with one or more products stored on a cloud-based storage, the plurality of digital content files including the first set of digital content files and the second set of digital content files.

16. The computer system of claim 10, wherein the instructions, when executed by the one or more processors, further cause the one or more processors to:
provide feedback to the manager associated with the user based on the monitoring.

* * * * *